W. H. KEMPTON.
COMPOSITE ROD AND METHOD OF FORMING IT.
APPLICATION FILED JULY 25, 1918.
1,370,023.  Patented Mar. 1, 1921.
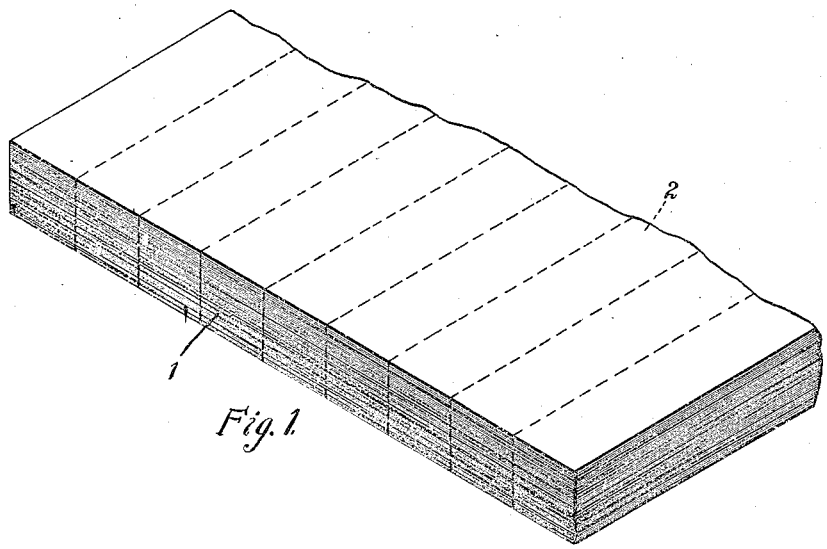
Fig. 1.
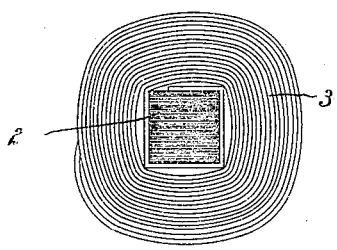
Fig. 2.
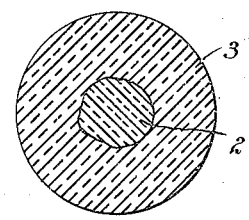
Fig. 3.
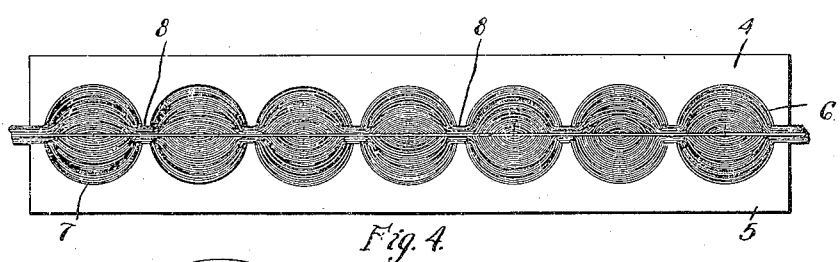
Fig. 4.
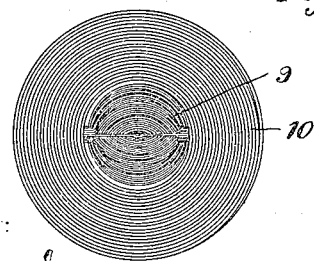
Fig. 5.
Fig. 6.
WITNESSES:
J. R. Wurmb
O. E. Bee.
INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE ROD AND METHOD OF FORMING IT.

1,370,023.     Specification of Letters Patent.     Patented Mar. 1, 1921.

Application filed July 25, 1918. Serial No. 246,766.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Composite Rods and Methods of Forming Them, of which the following is a specification.

My invention relates to improvements in composite rods and methods of forming them, and it has for its primary object the manufacture of rods by a method which will insure a strong and uniform product.

Heretofore, in the manufacture of rods constituting a plurality of superimposed convolutions of impregnated sheet material, difficulty has been experienced in starting the sheet material to roll. In view of this, one object of my invention is to construct a rod by methods which will obviate any difficulty in starting to roll the sheet material.

Methods heretofore employed in the manufacture of rods composed of superimposed layers of impregnated sheet material have been subject to criticism for the further reason that the central portions of the rods produced by such methods, being loosely rolled, are frequently of less density than the outer portions. For this reason, another object of my invention is to construct a rod which shall be of uniform composition and density throughout its entire structure.

A still further object of my invention is to construct a rod in which two different materials may be utilized in its manufacture.

With these and other objects in view, my invention will be more fully described in connection with the drawings, in which similar numerals indicate like parts, and will then be more particularly pointed out in the appended claims.

In the drawings, Figure 1 is a perspective view, parts being broken away, of a preformed plate of material which may be used in constructing a rod in accordance with my invention; Fig. 2 is an end view of a rod constructed in accordance with my invention, previous to being molded; Fig. 3 is a transverse sectional view of a finished rod which embodies my invention; Fig. 4 is an end view of a stack of laminated material compressed between forming die plates which have been disposed on opposite sides of it; Fig. 5 is an end view of a rod formed, by a different method, according to my invention and previous to being molded; Fig. 6 is a transverse sectional view of the rod shown in Fig. 5 after it has been molded.

In practising my invention, I may preform a plate by stacking sheets of impregnated material and subjecting the stacked material to just sufficient pressure and heat to compact the layers into a solid mass. The plate thus formed may be cut into strips and impregnated sheet material may be wound about the strips to a suitable thickness, the structure thus formed being then placed in a mold and subjected to heat and pressure to form a hard and homogeneous mass.

Another modification of my method comprises stacking sheets of impregnated material, placing plates on opposite sides of the stacked sheets, the plates having suitable longitudinal grooves in their opposed faces, and then applying pressure to the plates, thus corrugating the stacked sheets so that they may be cut into strips which are substantially cylindrical in cross section. The cut strips may then be used as cores about which the impregnated sheet material may be wound to a suitable depth, and the bodies thus formed may then be placed in a mold and sufficient heat and pressure applied to compact the material and harden the binder.

In Fig. 1 I have shown a preformed plate of material 1 which may be composed of any suitable sheet material impregnated with a binder, preferably a phenolic condensation product, such, for example, as bakelite, the stacked sheets having been subjected to sufficient pressure and heat to compact the material into a plate. The plate thus formed may be cut, as indicated by the dotted lines in Fig. 1, to form strips 2, and impregnated sheet material 3, which may be a fibrous material, such as paper, duck or muslin, is then wound about each strip 2 as a core until a suitable thickness of material has been reached. The structure thus formed is then placed in a mold and subjected to heat and pressure to compact the material 3 and the strip 2 and to harden the binder so that the resulting product is a hard and homogeneous mass, the material of the strip 2 being further slightly compacted while in the mold, such result being possible because the material was not thoroughly cured and hardened when preformed in the plate 1.

According to the method illustrated in Fig. 4, die plates 4 and 5 are placed on opposite sides of a plate of stacked sheets of impregnated material 6, corresponding to the plate 1 before the latter has been compressed. These die plates 4 and 5 have opposed grooved faces 7 adapted, under pressure, to form the interposed plate into substantially cylindrical strips connected by thin portions 8 along which the material may be cut to provide suitable cores 9, one of which is shown in Fig. 5, about which impregnated sheet material 10 may be wound to form a rod. The rods thus formed may then be placed in a mold and subjected to heat and pressure to compact the cores 9 and the layers 10 and to harden the binder with which they are uniformly impregnated.

The cores utilized in building up a rod according to my invention may be of the same material as the outer windings, and the binder employed may be the same, or the cores and outer windings may be of different materials, as may be desired.

Although I have illustrated and described several modifications of my method of constructing a rod, it is obvious that other modifications may be employed without departing from the spirit of my invention and I desire, therefore, that no limitations shall be imposed except such as are indicated in the appended claims.

I claim as my invention:

1. A composite rod comprising a precompressed, impregnated core and a surrounding body of impregnated material compacted and hardened under pressure.

2. A composite rod comprising a precompressed core of impregnated sheet material and a surrounding body of impregnated sheet material compacted and hardened under pressure.

3. A composite rod comprising a precompressed, impregnated core and superimposed layers of impregnated sheet material compacted and hardened under pressure.

4. A composite rod comprising a preformed core and superimposed layers of fibrous sheet material, the core and the surrounding material being impregnated with a phenolic condensation product which has been hardened.

5. A composite rod comprising a preformed core composed of stacked sheets of material impregnated with a hardened binder and superimposed layers of sheet material impregnated with a hardened binder.

6. A composite rod comprising a preformed core composed of layers of fibrous sheet material impregnated with a hardened binder and superimposed laminations of a similar material impregnated with a hardened binder.

7. A method of constructing composite rods which comprises preforming a core by stacking and compressing a plurality of sheets of fibrous material impregnated with a binder, winding a plurality of convolutions of impregnated sheet material about the core thus formed and subjecting the assembled body to heat and pressure to compact it and to harden the binder.

8. A method of constructing composite rods which comprises preforming a plate by stacking and compressing sheets of material impregnated with a phenolic condensation product, dividing the plate into strips, winding a plurality of convolutions of a similar sheet material, impregnated with a phenolic condensation product, about each strip and subjecting the bodies thus formed to heat and pressure to compact them and to harden the phenolic condensation product.

9. A method of constructing composite rods which comprises preforming a plate by stacking sheets of impregnated material, subjecting the plate thus formed to pressure between forming die plates having opposed longitudinally grooved working faces, thus shaping the preformed plate into elongate, cylindrical strips connected by thin portions, dividing the preformed plate into substantially elongate, cylindrical strips by cutting the thin connecting portions, winding impregnated sheet material about each cylindrical strip and treating the body thus formed to compact it and to harden the binder.

10. A method of constructing composite rods which comprises preforming a plate by stacking sheets of fibrous material impregnated with a phenolic condensation product, subjecting the plate thus formed to pressure between forming die plates having opposed, longitudinally grooved, working faces, thus shaping the preformed plate into elongate, cylindrical strips connected by thin portions, dividing the preformed plate into elongate, substantially cylindrical strips by cutting the thin, connecting portions, winding sheet material, impregnated with a phenolic condensation product, about each cylindrical strip and subjecting the body thus built up to heat and pressure to compact it and to harden the phenolic condensation product as a binder.

In testimony whereof, I have hereunto subscribed my name this 22nd day of July, 1918.

WILLARD H. KEMPTON.